United States Patent Office 3,767,730
Patented Oct. 23, 1973

3,767,730
METHOD FOR THE PRODUCTION OF MODIFIED POLYPHENYLENE OXIDES
Seizo Nakashio, Nishinomiya, and Isao Maruta, Kazuo Hayatsu, and Yoichi Kono, Takatsuki, Japan, assignors to Sumitomo Chemical Company, Limited, Osaka, Japan
No Drawing. Continuation-in-part of abandoned application Ser. No. 887,418, Dec. 22, 1969. This application Jan. 17, 1972, Ser. No. 218,591
Int. Cl. C08f 1/11, 19/08
U.S. Cl. 260—880 R                                9 Claims

ABSTRACT OF THE DISCLOSURE

A method for producing graft polymers by polymerizing in a dispersed state 0.3–10 parts by weight of a styrene type compound in the presence of 1 part by weight of a polyphenylene oxide and 0.01–2 parts by weight of a rubbery polymer in an aqueous medium containing a solvent for the polyphenylene oxide, a surface active agent and a catalyst. According to this method, it is possible to produce graft polymers which are large in polyphenylene oxide content and are high in graft efficiency of styrene type compounds. Further, the polymerization can be effected at a low styrene type compound concentration and the styrene type compound can be polymerized at a high conversion. Graft polymers obtained according to the above-mentioned method not only possess the properties inherent to polyphenylene oxides but also have improved flow property and enhanced oxidation and impact resistance.

---

This is a continuation-in-part application of application Ser. No. 887,418, filed Dec. 22, 1969 and now abandoned. This invention relates to a method for producing modified polyphenylene oxides which have been more improved in properties than those obtained according to conventional processes.

Polyphenylene oxides have been known as resins excellent in such properties as heat resistance, chemical resistance and mechanical and electrical properties, but have such drawback that they are relatively low in moldability due to their inherently high softening points.

With an aim to improve polyphenylene oxides in moldability without injuring the excellent properties inherent thereto, the present inventors previously found a process carried out by graft-polymerizing styrene type compounds on the polyphenylene oxides. It was found that unlike the conventionally known mixtures of polyphenylene oxides with polystyrenes, the thus graft-copolymerized and modified polyphenylene oxides have been improved in moldability without being greatly injured in properties inherent to the polyphenylene oxides.

As the result of further studies, the inventors have been able to find such fact as mentioned below. That is, if, in carrying out the graft-copolymerization of polyphenylene oxides with styrene type compounds in the presence of a rubbery polymer, the resulting modified polyphenylene oxide resins have excellent properties without being substantially injured in heat resistance inherent thereto, contrary to the fact that when a rubbery polymer is mixed with other polymer different in kind, the resulting mixture is lowered in heat resistance, in general. Thus, the present invention provides a novel method capable of giving modified polyphenylene oxides having excellent properties which have not been seen heretofore.

Processes for polymerizing styrenes in the presence of a polyphenylene oxide and a rubber component have already been disclosed in Dutch patent application No. 66–17529 and French patent No. 1,551,503. That is, it is well known to polymerize styrene in a suspension type aqueous dispersion in the presence of a polyphenylene oxide and a rubber component. However, in the process disclosed in said Dutch patent application, styrene is used in an amount far larger than the polyphenylene oxide. Further, in the process of said French patent also, styrene is used in more than about 3 times the amount of the polyphenylene oxide. It should therefore be said that these processes are techniques for the modification of polystyrenes rather than those for the modification of polyphenylene oxides.

As the result of detailed studies, the inventors have further found the following fact: That is, in a process for polymerizing a styrene type compound in a solvent in the presence of a radical- initiator as a catalyst, the conversion is greatly affected by the monomer concentration, and a conversion of more than 80% cannot be attained unless the monomer concentration is more than 70% by weight, ad if the monomer concentration is less than 70% by weight, e.g. 20% by weight, the conversion does not reach more than about 25%. Accordingly, the above-mentioned process is commercially disadvantageous. Further, in polymerizing a styrene compound in the presence of a polyphenylene oxide, the polyphenylene oxide inhibits or suppresses the polymerization of the styrene compound since said polyphenylene oxide contains a phenolic hydroxyl group, and the conversion of the styrene type compound is made lower than in the case where the polymerization is effected in the absence of polyphenylene oxide. Particularly when the amount of the polyphenylene oxide is large, there are some cases where the polymerization does not progress at all.

Such phenomena as mentioned above are observed also in the case where styrene is polymerized in an aqueous dispersion system in the presence of a polyphenylene oxide, and it has been found that the polymerization progresses only in the case where the amount of polyphenylene oxide is considerably smaller than that of styrene. The same phenomena as above are observed also in the case where styrene is polymerized in an aqueous dispersion system in the presence of a polyphenylene oxide and a rubber component.

The inventors experimentally carried out the polymerization of a styrene type compound in a dispersed state in an aqueous medium containing a surface active agent and a catalyst in the presence of a polyphenylene oxide and a rubbery polymer, but the dispersion system was poor in dispersed state to make impossible the smooth progress of polymerization. This experiment is set forth below as referential example.

REFERENTIAL EXAMPLE

Into a 200 ml. separable flask equipped with a thermometer, a nitrogen-injecting pipe and a condenser was charged a mixture of poly-2,6-dimethyl-1,4-phenylene oxide (hereinafter referred to as "the polyether"), a polybutadiene rubber obtained by demulsifying JSR 0700 produced by Japan Synthetic Rubber Co. and styrene. Into the flask, nitrogen gas was injected, while stirring the mixture, to exclude oxygen present in the system. Subsequently, 1.0% by weight based on the styrene of benzoyl peroxide was added as a catalyst, and then the nitrogen gas was sufficiently injected into the flask to exclude the oxygen. Thereafter, an aqueous slution containing sodium stearate as a surface active agent was added, and the resulting dispersion system was reacted with vigorous stirring at 80° C. for 10 hours.

After completion of the reaction, hydrochloric acid was added to separate the reaction liquid, and the organic layer was charged into methanol to precipitate a polymer, which was then filtered, washed and dried. The thus obtained polymer was extracted under reflux with acetone containing 15–20 wt. percent of cyclohexane, was filtered and was then extracted with fresh acetone containing 15–20 wt. percent of cyclohexane. This operation was repeated 10 times and the extraction was effected for 30 hours to obtain a graft polymer as an extraction residue. From the amount of the thus obtained graft polymer, styrene graft conversion and styrene graft efficiency were calculated according to the following equations:

Styrene graft conversion (percent)

$$= \frac{\begin{pmatrix} \text{Weight} \\ \text{of graft} \\ \text{polymer} \end{pmatrix} - \begin{pmatrix} \text{Weight} & \text{Weight of} \\ \text{of fed} & +\text{fed poly-} \\ \text{polyether} & \text{butadiene} \end{pmatrix}}{\text{Weight of fed styrene}} \times 100$$

Styrene graft efficiency (percent)

$$= \frac{\begin{pmatrix} \text{Weight} \\ \text{of graft} \\ \text{polymer} \end{pmatrix} - \begin{pmatrix} \text{Weight} & \text{Weight of} \\ \text{of fed} & +\text{fed poly-} \\ \text{polyether} & \text{butadiene} \end{pmatrix}}{\begin{pmatrix} \text{Weight} \\ \text{of total} \\ \text{polymer} \end{pmatrix} - \begin{pmatrix} \text{Weight} & \text{Weight of} \\ \text{of fed} & +\text{fed poly-} \\ \text{polyether} & \text{butadiene} \end{pmatrix}} \times 100$$

The results obtained were as shown in Table 1.

TABLE 1

| | Grams | | | | Percent | |
|---|---|---|---|---|---|---|
| Run No. | Styrene | Polyether | Rubber | Water | Surface active agent | Styrene graft conversion | Styrene graft efficiency |
| 1 | 10 | 10 | 1 | 20 | 0 | Slight | 0 |
| 2 | 10 | 10 | 1 | 20 | 2 | do | 0 |
| 3 | 10 | 15 | 1 | 30 | 0 | do | 0 |
| 4 | 10 | 15 | 1 | 30 | 2 | do | 0 |

Thus, in polymerizing according to the known process a styrene compound in a state dispersed in an aqueous medium in the presence of a polyphenylene oxide and a rubber component, the styrene compound should be used at a high concentration and in an amount greater than that of the polyphenylene oxide, as disclosed in Dutch patent application No. 66–17529. (According to the process of said Dutch patent application, styrene is used in at least 8 times the amount of polyether.) Accordingly, when the conversion is made high, the resulting polymerization product comes to contain a large amount of the styrene compound and thus is deprived of the excellent properties of the polyphenylene oxide. If the excellent properties of the polyphenylene oxide are desired to be maintained, the conversion of the styrene compound should be made low. Thus, the conventional process is economically disadvantageous.

It is well known that if components are same, a mixture and a graft polymer high in graft efficiency are greatly different from each other in properties, in general. Accordingly, there has been desired the advent of a graft polymer comprising a styrene type compound, a polyphenylene oxide and a rubber component which is higher in graft efficiency of the styrene type compound.

As the result of various studies on processes for polymerizing styrene in the presence of a polyphenylene oxide and a rubber component, the present inventors found that a graft polymer high in polyphenylene oxide content and high in graft efficiency of styrene type compound can be produced by polymerizing the aforesaid components in a dispersed state in an aqueous medium containing a solvent for the polyphenylene oxide, a surface active agent and a catalyst. The present invention has been attained on the basis of the above-mentioned finding.

According to the present invention in which a solvent is used, the polymerization can be effected by use of a styrene type compound in an amount relatively smaller than that of the polyphenylene oxide employed and at a low concentration of styrene type compound, and a high conversion of the styrene compound can be attained.

Further, according to the present invention, a graft polymer high in graft efficiency of styrene type compound can be produced. This signifies that substantially all of the fed styrene type compound has graft-polymerized with the polyphenylene oxide and rubber component employed and does not signify that no homopolymer of the styrene type compound is by-produced. However, the amount of the by-produced homopolymer is small and scarcely affects the moldability and the like physical properties of the resulting graft polymer.

In the present invention, there is used a solvent for the polyphenylene oxide employed. This signifies that since a polyphenylene oxide is prepared, in general, in a homogeneous system by use of a solvent, the reaction solution of polyphenylene oxide can be used as it is in the present invention.

The present invention is a method for producing graft polymers which comprises polymerizing a styrene type compound in a dispersed state in the presence of a polyphenylene oxide and a rubbery polymer in an aqueous medium containing a solvent for the polyphenylene oxide, a surface active agent and a radical initiator.

Polyphenylene oxides usable in the present invention have a unit structure represented by the formula,

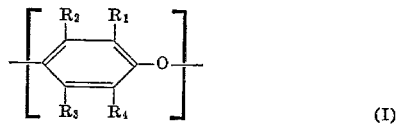

wherein $R_1$, $R_2$, $R_3$ and $R_4$ are a hydrogen atom, a halogen atom, a hydrocarbon group, a substituted hydrocarbon group, a cyano group, an amino group, a substituted amino group, a hydrocarbonoxy group, a substituted hydrocarbonoxy group or a nitro group.

Concretely, $R_1$, $R_2$, $R_3$ and $R_4$ are any of hydrogen, chlorine, bromine and iodine atoms, and methyl, ethyl, propyl, allyl, phenyl, benzyl, methylbenzyl, chloromethyl, bromomethyl, cyanoethyl, cyano, amino, methoxy, ethoxy, chloromethoxy, cyanoethoxy, phenoxy, p-chlorophenoxy and nitro groups.

Concrete examples of the polyphenylene oxides include poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-2,6 - dimethoxy-1,4-phenylene oxide, poly-2,6-dichloromethyl-1,4-phenylene oxide, poly-2,6-dibromomethyl-1,4-phenylene oxide, poly-2,6-ditolyl-1,4-phenylene oxide, poly-2,6-dichloro-1,4-phenylene oxide, poly-2,5-dimethyl-1,4-phenylene oxide and poly-2,6-diphenyl-1,4-phenylene oxide.

Examples of rubbery polymers usable in the present invention include polybutadiene, polyisoprene (including natural rubber), polychloroprene, butadiene-styrene copolymer, butadiene-styrene block copolymer, polybutadiene-styrene graft copolymer, polyisoprene-styrene graft copolymer, isoprene-styrene copolymer, poly(butadiene-acrylonitrile)-styrene graft copolymer, butadiene-acrylonitrile copolymer, poly(butadiene-styrene)-α-methylstyrene graft copolymer, poly(butadiene-styrene)-methyl methacrylate graft copolymer, poly(butadiene-styrene)-styrene graft copolymer, poly(butadiene-styrene)-styrene-acrylonitrile graft copolymer, polychloroprene-styrene graft copolymer and poly(butadiene-acrylonitrile)styrene graft copolymer. These rubbery polymers are used in an amount of 0.01–2 parts by weight, preferably 0.01–1 part by weight, per part by weight of the polyphenylene oxides.

Styrene type compounds employed in the present invention are represented by the formula,

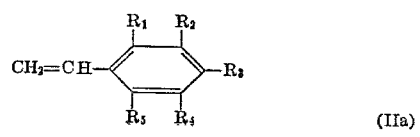

(IIa)

or

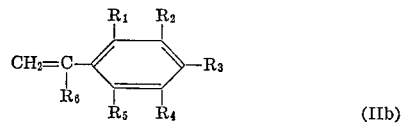

(IIb)

wherein $R_1$, $R_2$, $R_3$, $R_4$ and $R_5$ are a hydrogen atom, a halogen atom, a cyano group, an amino group, a substituted amino group, a hydroxy group, a carboxyl group, a hydrocarbon group, a substituted hydrocarbon group, a hydrocarbonoxy group or a substituted hydrocarbonoxy group; and $R_6$ is a hydrocarbon group.

The compounds represented by the Formula IIa may be used either alone or in combination with the compounds represented by the Formula IIb.

Concretely, $R_1$, $R_2$, $R_3$, $R_4$ and $R_5$ are any of hydrogen, chlorine, bromine and iodine atoms, hydroxy, carboxyl, methyl, ethyl, propyl, allyl, phenyl, benzyl, methylbenzyl, chloromethyl, bromomethyl, cyanoethyl, cyano, nitro, amino, methoxy, ethoxy, chloromethoxy, phenoxy, and p-chlorophenoxy groups; and $R_6$ is a methyl group.

Concrete examples of the styrene type compounds include styrene, 2,4-dichlorostyrene, o-hydroxy styrene, p-carboxyl styrene, p-nitrostyrene, p-methoxystyrene, p-methylstyrene, p-phenylstyrene, p-acetoxystyrene, p-aminostyrene, o-cyanostyrene, o-hydroxystyrene, p-hydroxstyrene, o-divinylbenzene, p-divinylbenzene, α-methylstyrene, p-methoxy-α-methylstyrene, p-methyl-α-methylstyrene, m-methyl-α-methylstyrene, o-methyl-α-methylstyrene, and 1,1-diphenylethylene.

These styrene type compounds may be used in any amount. However, for the purpose of modification of polyphenylene oxides, they are desirably used in an amount of 0.3–10 parts by weight per part by weight of the polyphenylene oxides. Further, the styrene type compounds represented by the Formula IIb are preferably used in an amount of less than 40% by weight based on the total styrene amount.

The aqeuous medium employed in the present invention contains a surface active agent, a catalyst and a solvent, and may sometimes contain a dispersion stabilizer.

As the catalyst, there may be used any of those employed in the prior art such as, for example, Lewis acids or oragnometallic compounds. In that case, it is necessary to adopt a polymerization system suitable for the catalyst. For commercial practice of the present method, however, it is desirable to use as a polymerization catalyst for the styrene type compound a common organic or inorganic radical-initiator.

Examples of such radical-initiator include octanoyl peroxide, decanoyl peroxide, stearoyl peroxide, lauroyl peroxide, 2,5-dimethyl-2,5-di(tert-butyl peroxy)hexane, 3,5,5-trimethyl-hexamoyl peroxide, 2,4-dichloro-benzoyl peroxide, benzoyl peroxide, tert-butyl peroxybenzoate, tert-butyl peroxyisobutyrate, tert-butyl peroxyacetate, tert-butyl peroxypivalate, diisopropylbenzene hydroperoxide, di-tert-butyl peroxide, 2,5-bis(tert-butyl-peroxy)butane, cyclohexanone peroxide, methyl ethyl ketone peroxide, dicumyl peroxide, α,α'-azobisisobutylronitrile, hydrogen peroxide, potassium persulfate, ammonium persulfate and sodium perborate. These radical-initiator may be used in combination of 2 or more. In order to attain sufficiently high polymerization rates at low temperatures, it is sometimes advantageous to use redox type catalysts prepared by adding reducing agents to the above-mentioned radical-initiator. Frequently employed reducing agents include glucose, fructose, ammonium ferrous sulfate, sodium hydrogen sulfite, N,N-dimethylaniline, tetraethylenepentamine, p-chlorobenzenesulfinic acid, benzoin, acetoin, glyceraldehyde and dioxyacetone. These catalysts may be used in combination of 2 or more, and may be incorporated with such additives as sodium pyrophosphate, sodium hydrogenphosphate, etc. The catalysts are preferably used in an amount of 0.01–5% by weight based on the amount of styrene type compound.

The surface active agent employed in the present invention may be suitably selected from anionic, cationic and nonionic surface active agents. Particularly preferable surface active agents usable in the present invention are alkali metal salts of higher fatty acids, alkali metal salts of alkylbenzenesulfonic acids, fatty acid esters of polyoxyethylene and alkyl ethers of polyoxyethylene. Concrete examples of particularly effective surface active agents include sodium stearate, potassium stearate, sodium oleate, sodium palmitate, sodium myristate, sodium laurate, potassium laurate, sodium dodecylbenzenesulfonate, polyoxyethylene monooleate, polyoxyethylene distearate, polyoxyethylene lauryl ether and polyoxyethylene-9-octadecene ether. These surface active agents may be used in combination of 2 or more. The surface active agents are not particularly limited in amount employed, but are preferably used in a proportion of 0.01–5% by weight based on the amount of water.

When these surface active agents are used in combination with so-called dispersion stabilizers such as, for example, polyvinyl alcohol, methyl cellulose, carboxymethyl cellulose, hydroxyethyl cellulose, starch, agar, sodium glycolate, calcium carbonate, calcium phosphate, magnesium carbonate, talc, bentonite, etc., there is brought about such effect that the aqueous dispersion system is stabilized.

Solvents usable in the present invention may be any of those employed in the prior art, so far as they dissolve the polyphenylene oxides but are insoluble in water, and are inert to the polymerization reaction. These solvents are not particularly required to be good solvents for the rubbery polymers employed. Examples of such solvents include benzene, toluene, xylene, ethylbenzene, isopropylbenzene, n-propylbenzene, n-butylbenzene, sec-butylbenzene, t-butylbenzene, mesitylene, asymmetrical trimethylbenzene, isobutylbenzene, tetramethylbenzene, indene, indane, amylbenzene, diethylbenzene, octylbenzene, isopropyltoluene, n-propyltoluene, methylethylbenzene, t-butylethylbenzene, halogen- or nitro-substitution products of aromatic hydrocarbons such as chlorobenzene, bromobenzene, dichlorobenzene, dibromobenzene, nitrobenzene, ous medium containing the aforesaid surface active agent, chloro-nitrobenzene, bromonitrobenzene, dinitrobenzene, chlorotoluene, dichlorotoluene, bromotoluene, iodotoluene, nitrotoluene, chloroethylbenzene, chloroxylene, and halogenated nonaromatic hydrocarbons such as chloroform, carbontetrachloride, and methylchloroform. These solvents are used in an amount of 0.5–20 times, preferably 1–10 times, the weight of the polyphenylene oxides.

Water may be used in optional amount, but is ordinarily used in an amount of 0.5–10 times, preferably 1–6 times, the total weight of the polyphenylene oxide, the rubbery polymer, the styrene type compound and the solvent.

For the advantageous production of modified polyphenylene oxides according to the present method, it is desirable to adopt such conditions that 0.3–10 parts by weight of the styrene type compound is polymerized in the presence of 1 part by weight of the polyphenylene oxide and 0.01–1 part by weight of the rubbery polymer in an aqueous medium containing the aforesaid surface active agent, catalyst, dispersion stabilizer and solvent for the polyphenylene oxide.

In the present invention, the order and manner of addition of polyphenylene oxide, rubbery polymer, styrene type compound, surface active agent, catalyst and other reaction reagents are not restricted. For example, there may be adopted such procedures that the styrene type compound is added to a solution containing the polyphenylene oxide and the rubbery polymer, and then the resulting mixture is charged with an aqueous solution containing the catalyst and the surface active agent; or that water is charged with the styrene compound and a solution containing the polyphenylene oxide and the rubbery polymer, and then the catalyst and the surface active agent are added to the resulting mixture.

In the present method, the rubbery polymer may be used not only in the form of rubber itself but also in the form of a solution or a latex. The rubbery polymer may be added at the initial stage of the reaction, as mentioned above, or may be added at a suitable stage during the polymerization reaction in order to vary the extent of contribution of the rubbery polymer to the graft polymerization, taking the properties of the resulting modified polyphenylene oxide into consideration. This is decided according to the interrelation with the gelation ratio, molecular weight and other physical properties or the amount of the rubbery polymer added.

In producing, for example, an impact resistant modified polyphenylene oxide according to the present method, it is desirable that the rubbery polymer takes part in the graft-polymerization, while maintaining a state of molecules having a suitable particle diameter. Preferable particle diameter of the rubbery polymer is from $0.1\mu$ to $10\mu$.

In the present invention, the polymerization reaction temperature is not particularly limited so far as the reaction mixture is in the form of a liquid, but is preferably from 40° to 150° C. Further, the reaction can be effected not only at normal pressure but also under pressure or under reduced pressure.

If, in the present invention, oxygen is present in the reaction system, the polymerization rate, the graft efficiency and the like are adversely affected. Generally, therefore, it is desirable to carry out the reaction in an inert gas atmosphere or under reduced pressure. This, however, does not mean that the oxygen should be completely removed during the polymerization reaction.

According to the present invention, the molecular weight of the styrene type compound grafter on the polyphenylene oxide and the rubbery polymer can be controlled by varying the concentrations of the styrene type compound, the polyphenylene oxide, the rubbery polymer and the catalyst. Alternatively, however, said molecular weight may be controlled by addition of a chain transfer agent employed in an ordinary polymerization reaction. Such chain transfer agents include mercaptans and alcohols. By controlling the molecular weight of the grafted styrene type compound and the number of grafted branches, the physical properties of the grafted polyphenylene oxide can be varied.

After completion of the reaction, the polymer may be recovered in such a manner that the reaction mixture as it is, or only an oil layer separated by demulsifying the reaction mixture, is charged into a poor solvent for the polymer, or such poor solvent is added to the reaction mixture or to said oil layer, to deposit the polymer, followed by drying. Alternatively, the polymer may be recovered by directly subjecting the reaction mixture or said oil layer to hot air-drying or spray-drying.

Gaft polymers produced in accordance with the present invention have been improved in flow property and enhanced, at the same time, in oxidation and impact resistance, without any substantial change in properties inherent to polyphenylene oxides. That is, in accordance with the present invention, there are obtained, without any treatment of free hydroxyl groups of polyphenylene oxides, graft polymers which do not substantially change in color tone at the time of heating, are high in resistance to oxidation at elevated temperatures, and are higher in impact resistance and alongation than polyphenylene oxides.

The present invention is illustrated below with reference to examples, but it is needless to say that the examples are illustrative and various modifications are possible within the scope of the invention.

EXAMPLE 1

In a 500 ml. separable flask equipped with a thermometer, a nitrogen-injecting pipe and a condenser, 16 g. of poly-2,6-dimethyl-1,4-phenylene oxide ($[\eta]=0.65$ dl./g. in chloroform at 25° C.,) which had been obtained by oxidation coupling reaction using manganese chloride (II)-sodium methylate as a catalyst, was dissolved in 48 g. of industrial xylene, and then 1.6 g. of a polybutadiene prepared by demulsifying JSR 0700 (trade name of a rubber produced by Japan Synthetic Rubber Co.) was dissolved in the resulting solution. To this solution were added 16 g. of styrene, 192 g. of distilled water, 3.4 g of sodium stearate as a surface activeagent, and a mixture of 0.2 g. of benzoyl peroxide and 0.074 g. of glucose as a catalyst. Subsequently, nitrogen gas was injected into the flask, while dispersing the mixture with vigorous stirring (620 r.p.m.), to exclude oxygen present in the system, and then the mixture was reacted with stirring at 80° C. for 5 hours. After completion of the reaction, the reaction product was demulsified by addition of 4 ml. of concentrated hydrochloric acid. Thereafter, the organic layer was charged into 500 ml. of methanol, and the resulting precipitate was recovered by filtration to obtain 31.2 g. of a white polymer.

The thus obtained polymer was extracted for 30 hours with hot acetone containing 15–20% by weight of cyclohexane, whereby 29.2 g. of an acetone containing 15–20% by weight of cyclohexane insoluble portion was obtained. From this were calculated the values of such physical properties as styrene graft conversion, styrene graft efficiency, proportion of bonded styrene based on the total polymer, etc. These values are shown in Table 3.

In Table 2, there is shown a comparison of the physical property values of the above-mentioned graft polymer with those of a mixture prepared by solution-blending 55.2 parts by weight of the polyphenylene oxide ($[\eta]=0.65$ dl./g. in chloroform at 25° C.) and 5.0 parts by weight of the polybutadiene both employed in the above-mentioned reaction, and 39.8 parts by weight of polystyrene ($\overline{M}w=270,000$).

TABLE 2

|  | Graft polymer | Mixture |
| --- | --- | --- |
| Charpy impact value (kg.cm./cm.$^2$) | 12.3 | 4.1 |
| Vicat softening point (° C.) | 140 | 121 |
| Modulus of tensile elasticity (kg./cm.$^2$) | 10,000 | 8,300 |

The test pieces were prepared by rolling at 220–230° C. for 5 minutes and then hot-pressing at 220° C. under pressure of 100 kg./cm.$^2$ for 10 minutes.

Impact test was carried out according to JIS–6745 (notched, 20° C.).

Vicat softening point was measured according to ASTM–D–1525–65T.

Tensile test was carried out according to JIS–6745 at a tensile speed of 10 mm./min. (20° C.).

EXAMPLE 2

Example 1 was repeated, except that 2.6 g. of a polybutadiene latex (JSR 0700 produced by Japan Synthetic Rubber Co.; solid content 60%) was used as the polybutadiene, to obtain 31.0 g. of a white polymer.

The thus obtained polymer was treated in the same manner as in Example 1. The characteristic values of the polymerization and the physical property values of the polymer are shown in Table 3.

EXAMPLE 3

Example 1 was repeated, except that 2.6 g. of a polybutadiene latex (JSR 0700 produced by Japan Synthetic Rubber Co.; solid content 60%) was added to the reaction system after 4 hours and 30 minutes from initiation of the heating reaction, to obtain 31.7 g. of a white polymer.

The thus obtained polymer was treated in the same manner as in Example 1. The characteristic values of the polymerization and the physical properties of the polymer are shown in Table 3.

EXAMPLE 4

Examples 1, 2 and 3 were repeated, except that a mixture of 0.2 g. of potassium persulfate and 0.3 g. of sodium hydrogensulfite was used as the catalyst, to obtain 31.2 g., 29.3 g. and 31.2 g. of white polymers, respectively.

The thus obtained polymers were treated in the same manner as in Example 1. The characteristic value of the polymerization and the physical properties of the individual polymers are shown in Table 3, columns 4–1, 4–2 and 4–3, respectively.

EXAMPLE 5

Examples 1, 2 and 3 were repeated, except that a mixture of 0.164 g. of 3,5,5-trimethylhexanoyl peroxide and 0.088 g. of tert-butyl peroxybenzoate was used in place of the benzoyl peroxide, to obtain white polymers.

The thus obtained polymers were treated in the same manner as in Example 1. The results are shown in Table 3, columns 5–1, 5–2 and 5–3, respectively.

EXAMPLE 6

Example 1 was repeated, except that 1.9 g. of a polybutadiene-styrene graft copolymer latex (solid content 60%, bonded styrene content 25%) was used as the rubbery polymer and a mixture of 10 g. of styrene and 6 g. of α-methyl-p-methyl-styrene was used in place of 16 g. of styrene, to obtain a white polymer. The results are shown in Table 3.

EXAMPLE 7

Example 1 was repeated, except, that 1.9 g. of a polybutadiene-styrene graft copolymer (bonded styrene content 25%) was used in place of the polybutadiene. The results are shown in Table 3.

EXAMPLE 8

Examples 2 and 3 were repeated, except that 3.0 g. of a polybutadiene-styrene graft copolymer latex (solid content 60%, bonded styrene content 25%) was used in place of the polybutadiene latex. The results are shown in Table 3, columns 8–1 to 8–2, respectively.

EXAMPLE 9

Example 2 was repeated, except that a mixture of 8 g. of styrene and 8 g. of p-methoxystyrene was used in place of 16 g. of styrene. The results are shown in Table 3.

EXAMPLE 10

Example 2 was repeated, except that poly-2,6-diethyl-1,4-phenylene oxide having a molecular weight of 70,000 was used in place of the poly-2,6-dimethyl-1,4-phenylene oxide. The results are shown in Table 3.

EXAMPLE 11

Example 2 was repeated, except that each of the compounds set forth in Table 4 was used as the surface active agent. The results are shown in Table 4.

TABLE 4

| Run No. | Surface active agent | Monomer conversion (Percent) | Graft conversion (Percent) | Graft efficiency (Percent) |
|---|---|---|---|---|
| 1 | Sodium stearate | 84.5 | 68.8 | 81.5 |
| 2 | Sodium myristate | 80.0 | 70.0 | 89.9 |
| 3 | Sorbitan monolaurate | 12.5 | 6.0 | 48.0 |
| 4 | Lauryl trimethylammonium chloride | 0 | 0 | 0 |
| 5 | Polyoxyethylene alkylamine | 0 | 0 | 0 |
| 6 | Sodium carboxymethyl cellulose | 0 | 0 | 0 |
| 7 | 10:1 Sodium stearate-sodium carboxymethyl cellulose mixture | 83.8 | 69.5 | 83.0 |

EXAMPLE 12

Example 2 was repeated, except that each of the compounds shown in Table 5 was used as the solvent. The results are shown in Table 5.

TABLE 5

| | Ethyl-benzene | Iso-propyl benzene | Chloro-benzene | Chloro-ethyl-benzene |
|---|---|---|---|---|
| Amount of solvent (g.) | 16 | 8 | 10 | 8 |
| Amount of styrene (g.) | 20 | 25 | 10 | 10 |
| Monomer conversion (wt. percent) | 85 | 84 | 80 | 87 |
| Styrene graft conversion (wt. percent) | 71 | 62 | 61 | 68 |
| Styrene graft efficiency (wt. percent) | 83.5 | 73.8 | 76.3 | 78.2 |
| Charpy impact strength (kg·cm./cm.²) | 11.6 | 10.3 | 14.2 | 13.9 |
| Vicat softening point (° C.) | 143 | 138 | 167 | 166 |

We claim:

1. A method for producing graft polyphenylene oxides which comprises polymerizing in a dispersed state a styrene type compound represented by the formula,

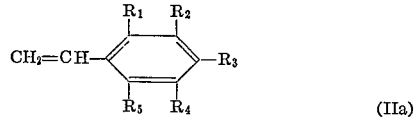

(IIa)

wherein $R_1$, $R_2$, $R_3$, $R_4$, and $R_5$ are a hydrogen atom, a halogen atom, a cyano group, a nitro group, an amino group, a substituted amino group, a hydroxy group, a carboxyl group, a hydrocarbon group, a substituted hydrocarbon group, a hydrocarbonoxy group or a substituted hydrocarbonoxy group, either alone or in combination with a styrene type compound represented by the formula

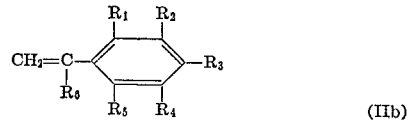

(IIb)

wherein $R_1$, $R_2$, $R_3$, $R_4$ and $R_5$ are the same as defined above, and $R_6$ is a hydrocarbon group, the amount of the styrene type compound of the Formula IIa or a mixture thereof with the styrene type compound of the Formula IIb being 0.3 to 10 parts by weight per part by

TABLE 3

| Example | 1 | 2 | 3 | 4–1 | 4–2 | 4–3 | 5–1 | 5–2 | 5–3 | 6 | 7 | 8–1 | 8–2 | 9 | 10 |
|---|---|---|---|---|---|---|---|---|---|---|---|---|---|---|---|
| Styrene graft conversion (wt. percent) | 72.5 | 68.8 | 70.0 | 55.3 | 53.6 | 50.1 | 72.3 | 68.0 | 74.0 | 70.0 | 70.3 | 69.0 | 72.5 | 75 | 72 |
| Styrene graft efficiency (wt. percent) | 85.3 | 81.5 | 79.0 | 65.0 | 67.0 | 59.0 | 85.0 | 83.0 | 87.0 | 75.0 | 82.0 | 84.0 | 86.0 | 88 | 85 |
| Proportion of bonded styrene based on total polymer (wt. percent) | 39.8 | 38.1 | 38.8 | 33.6 | 32.9 | 32.0 | 39.7 | 40.1 | 40.3 | 41.2 | 40.3 | 40.0 | 41.3 | 40.7 | 42.1 |
| Proportion of butadiene based on total polymer (wt. percent) | 5.0 | 5.5 | 5.4 | 5.9 | 6.0 | 6.1 | 5.3 | 5.5 | 5.3 | 5.0 | 5.0 | 4.7 | 4.6 | 5.3 | 5.7 |
| Charpy impact value (kg. cm./cm.²) | 12.3 | 11.9 | 12.3 | 11.7 | 12.5 | 13.0 | 13.8 | 12.0 | 12.8 | 13.0 | 13.3 | 14.1 | 14.0 | 13.0 | 12.7 |
| Vicat softening point (° C.) | 140 | 139 | 141 | 145 | 145 | 147 | 143 | 140 | 140 | 148 | 142 | 142 | 139 | 142 | 138 |
| Modulus of tensile elasticity (kg./cm.²) | 10,000 | 9,900 | 9,200 | 10,000 | 10,000 | 10,000 | 9,700 | 9,900 | 9,800 | 9,500 | 10,000 | 11,000 | 10,000 | 9,750 | 10,000 | weight of the polyphenylene oxide defined below, in the presence of 0.01 to 2 parts by weight of a rubbery polymer composed of homopolymers of conjugated dienes and copolymers thereof with monoethylenically unsaturated monomers and 1 part by weight of a polyphenylene oxide having a unit structure represented by the formula,

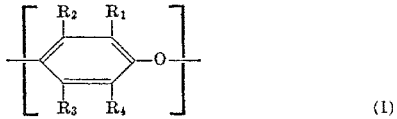

wherein $R_1$, $R_2$, $R_3$, and $R_4$ are a hydrogen atom, a halogen atom, a hydrocarbon group, a substituted hydrocarbon group, a cyano group, a hydrocacrbonoxy group, a substituted hydrocarbonoxy group, an amino group, a substituted amino group or a nitro group, in an aqueous medium containing a solvent for said polyphenylene oxide selected from the group consisting of benzene, an alkyl-, halogen- or nitro-substituted product of an aromatic hydrocarbon, and a halogenated non-aromatic hydrocarbon, water, an anionic or a nonionic surfactact and a radical-initiator, the amount of the solvent being 0.5 to 20 parts by weight per 1 part by weight of the polyphenylene oxide and the amount of water being 0.5–10 times the total weight of the polyphenylene oxide, the rubbery polymer, the styrene type compound and the solvent.

2. A method according to claim 1, wherein the styrene type compound is styrene, p-methylstyrene, o-methylstyrene, p-methoxystyrene, p-aminostyrene, p-chlorostyrene or o-hydroxystyrene.

3. A method according to claim 1, wherein the α-substituted styrene derivative is α-methylstyrene, p-methyl-α-methylstyrene, m-methyl-α-methylstyrene or o-methyl-α-methylstyrene.

4. A method according to claim 1, wherein the amount of the α-substituted styrene derivative is less than 40% by weight based on the weight of the total styrene type compound.

5. A method according to claim 1, wherein the rubbery polymer is polybutadiene, polyisoprene, polychloroprene, polybutadiene-styrene graft copolymer, butadiene-styrene random copolymer, butadiene-styrene block copolymer or poly(butadiene-styrene)-styrene graft copolymer.

6. A method according to claim 1, wherein the polyphenylene oxide is poly(2,6-dimethyl-1,4-phenylene oxide).

7. A method according to claim 1, wherein the anionic or nonionic surfactant is sodium stearate, potassium stearate, sodium myristate, sodium laurate, potassium laurate, sorbitan monolaurate, polyoxyethylene monolaurate, sodium dodecylbenzenesulfonate or polyoxyethylene-9-octadecene.

8. A method according to claim 1, wherein the radical initiator is benzoyl peroxide, 3,5,5-trimethylhexanoyl peroxide, lauroyl peroxide, dicumyl peroxide, tert-butyl peroxybenzoate or potassium persulfate.

9. A method according to claim 1, wherein the solvent is, toluene, xylene, ethylbenzene, isopropylbenzene, chlorobenzene, nitrobenzene, chloroform or carbon tetrachloride.

References Cited
UNITED STATES PATENTS

| | | | |
|---|---|---|---|
| 3,356,761 | 12/1967 | Fox | 260—874 |
| 3,384,682 | 5/1968 | Erchak et al. | 260—874 |
| 3,487,127 | 12/1969 | Erchak et al. | 260—876 |
| 3,664,977 | 5/1972 | Nakanishi | 260—880 |

JAMES A. SEIDLECK, Primary Examiner

U.S. Cl. X.R.

260—876 R, 876 B, 880 B

UNITED STATES PATENT OFFICE
CERTIFICATE OF CORRECTION

Patent No. 3,767,730　　　　　　　　　Dated　October 23, 1973

Inventor(s) Seizo NAKASHIO et al

It is certified that error appears in the above-identified patent and that said Letters Patent are hereby corrected as shown below:

The Priority data is missing and should be inserted as follows:

--Japan, Appln. No. 525/69 filed December 28, 1968. --.

Signed and sealed this 16th day of July 1974.

(SEAL)
Attest:

McCOY M. GIBSON, JR.　　　　　　　　C. MARSHALL DANN
Attesting Officer　　　　　　　　　　Commissioner of Patents